US009383913B2

(12) United States Patent  (10) Patent No.: US 9,383,913 B2
Hoyer et al.  (45) Date of Patent: Jul. 5, 2016

(54) TOUCH SCREEN DEVICE DATA FILTERING

(75) Inventors: Timo Hoyer, San Francisco, CA (US); Sascha Hans Grub, Saarbruecken (DE)

(73) Assignee: SAP SE, Walldorf (DE)

( * ) Notice: Subject to any disclaimer, the term of this patent is extended or adjusted under 35 U.S.C. 154(b) by 737 days.

(21) Appl. No.: 13/483,471

(22) Filed: May 30, 2012

(65) Prior Publication Data

US 2013/0321285 A1  Dec. 5, 2013

(51) Int. Cl.
   *G06F 3/00*   (2006.01)
   *G06F 3/0488*  (2013.01)
   *G06F 3/01*   (2006.01)

(52) U.S. Cl.
   CPC .................................. *G06F 3/0488* (2013.01)

(58) Field of Classification Search
   USPC ......... 715/838, 765, 224, 752, 760, 784, 808, 715/766, 843
   See application file for complete search history.

(56) References Cited

U.S. PATENT DOCUMENTS

| | | | | |
|---|---|---|---|---|
| 6,269,188 | B1* | 7/2001 | Jamali ........................... | 382/229 |
| 7,752,301 | B1* | 7/2010 | Maiocco et al. ............... | 709/224 |
| 9,002,977 | B2* | 4/2015 | Thaxter et al. ................ | 709/217 |
| 9,043,411 | B2* | 5/2015 | Claux et al. ................... | 709/206 |
| 9,063,990 | B2* | 6/2015 | Buchheit et al. | |
| 2006/0031148 | A1* | 2/2006 | O'Dell et al. .................. | 705/28 |
| 2007/0061369 | A1* | 3/2007 | Folting et al. ................. | 707/200 |
| 2007/0162936 | A1* | 7/2007 | Stallings et al. ............... | 725/58 |
| 2008/0150959 | A1* | 6/2008 | Marui ............................ | 345/594 |
| 2008/0163085 | A1* | 7/2008 | Subbu et al. .................. | 715/763 |
| 2008/0307343 | A1* | 12/2008 | Robert ................ | G06F 3/04817 715/765 |
| 2008/0313529 | A1* | 12/2008 | Gwozdz et al. ............... | 715/224 |
| 2009/0043714 | A1* | 2/2009 | Zhao et al. ...................... | 706/11 |
| 2009/0119678 | A1* | 5/2009 | Shih et al. ...................... | 719/313 |
| 2010/0138764 | A1* | 6/2010 | Hatambeiki et al. .......... | 715/765 |
| 2010/0162172 | A1* | 6/2010 | Aroner ........................... | 715/838 |
| 2010/0240402 | A1* | 9/2010 | Wickman et al. ............. | 455/466 |
| 2010/0281398 | A1* | 11/2010 | Melideo ................ | H04M 7/003 715/753 |
| 2011/0016432 | A1* | 1/2011 | Helfman ........................ | 715/843 |
| 2011/0145744 | A1* | 6/2011 | Haynes et al. ................. | 715/766 |
| 2011/0276918 | A1* | 11/2011 | Bennett ......................... | 715/808 |
| 2012/0079382 | A1* | 3/2012 | Swenson .............. | G11B 27/105 715/716 |
| 2012/0227004 | A1* | 9/2012 | Madireddi et al. ............ | 715/771 |
| 2012/0324390 | A1* | 12/2012 | Tao ................................ | 715/771 |
| 2013/0067393 | A1* | 3/2013 | Demopoulos et al. ........ | 715/784 |
| 2013/0111320 | A1* | 5/2013 | Campbell et al. ............. | 715/212 |
| 2013/0111368 | A1* | 5/2013 | Laughlin ....................... | 715/760 |
| 2013/0283142 | A1* | 10/2013 | Farzin et al. .................. | 715/224 |
| 2014/0096033 | A1* | 4/2014 | Blair ............................. | 715/752 |
| 2014/0223371 | A1* | 8/2014 | Kaprani et al. ............... | 715/810 |

* cited by examiner

*Primary Examiner* — Toan Vu

(57) ABSTRACT

A data filtering menu enabling a user to select different characteristics and values may be displayed. Each of the characteristics may be displayed in a first selectable list in the filtering menu. Once a user selects one of the characteristics, a second list containing selectable values associated with the selected characteristic may be displayed in a second list. The selected values may filter a set of data and the list of characteristics may be modified to display a representation of values selected from one or more of the second lists. Additionally, a selectable object associated with a characteristic having user selected values may also be displayed with a filtered result. If this object is selected, a list of values from the second list may be redisplayed. The user may then select different values and re-executed the filter with the new values.

19 Claims, 8 Drawing Sheets

TOUCH SCREEN DEVICE DATA FILTERING

BACKGROUND

Touch screen devices, such as a smart phones and tablets, allowed users to interact with applications on smaller portable devices without the need for an external keyboard, touchpad, or mouse. The smaller displays of these portable devices resulted in less viewable content on the touch screen. Additionally, the use of fingers and other objects to interact with applications through the touch screen, required larger buttons and selectable objects to accommodate the larger surface area of fingers. The larger buttons and selectable objects often results in even less content being displayed.

The less content that is displayed, the more difficult for users to use sophisticated applications that include large numbers of user selectable and/or customizable parameters. For example, data analysis and business intelligence applications often include the ability to forecast multiple scenarios by selecting and/or varying different characteristics, such as different data fields, parameters, conditions, and variables, for business planning and other purposes. The large number of different data options and selectable characteristics has made it difficult for users to efficiently analyze data from these touch screen devices without having to scroll through many different menu and submenu combinations.

There is a need for intuitive and efficient techniques for user to adjust and select data characteristics when analyzing data on these touch screen devices.

DETAILED DESCRIPTION

Figure 1:
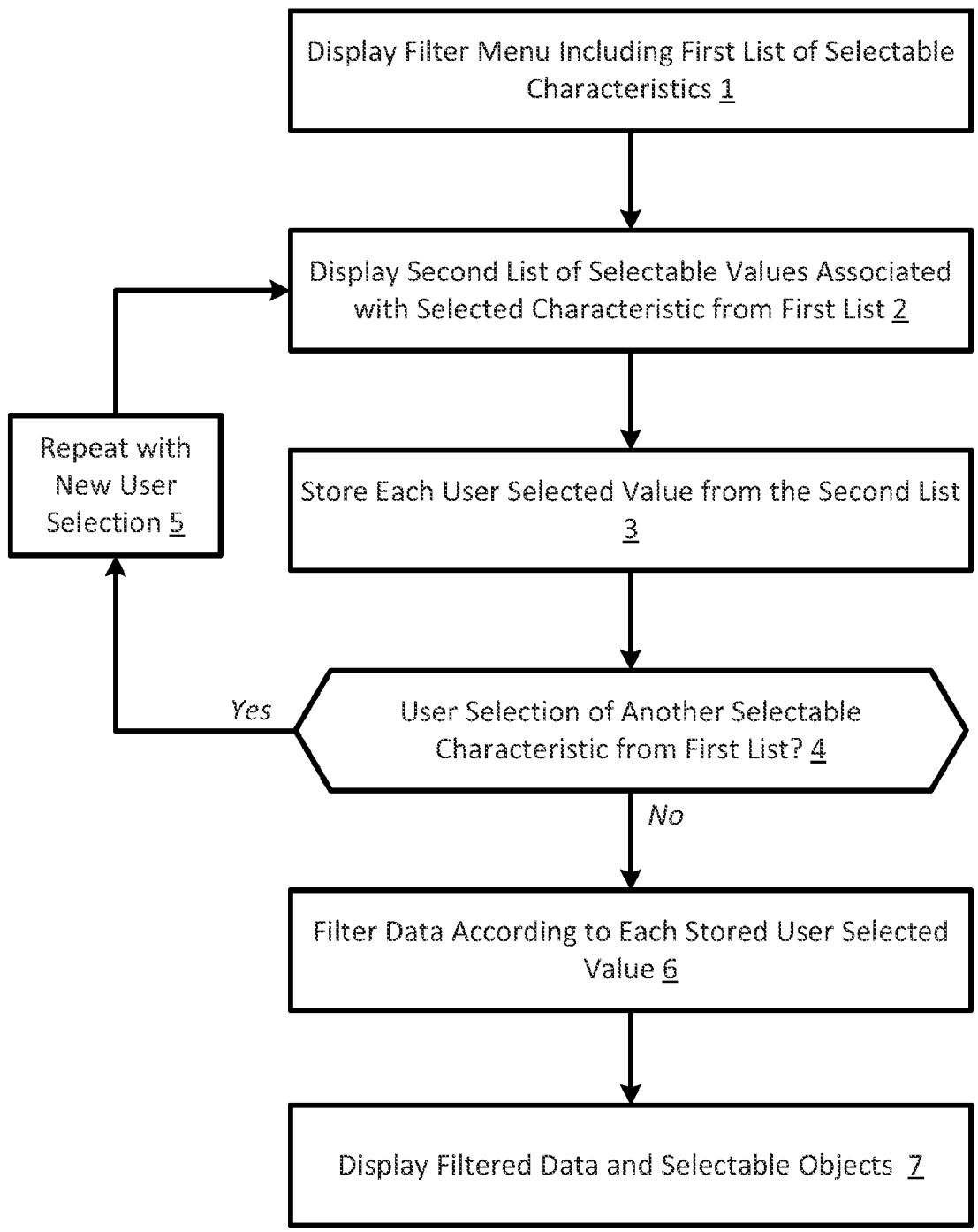
FIG. 1 shows an exemplary process in an embodiment.

A data filtering menu enabling a user to select different characteristics and values associated with each characteristic may be displayed to a user through a touch sensitive interface. Each of the characteristics may be displayed in a first selectable list in the filtering menu. Once a user selects one of the characteristics, a second list containing selectable values associated with the selected characteristic may be displayed in a second list appearing side-by-side to the list of characteristics in the filtering menu.

A user may then select one or more of the values in the second list. The selected values are later used to limit a set of data to those data values having the selected values from the second list for the associated characteristic. A user may select different values for different characteristics by touching a different characteristic in the list of characteristics. Each time a user touches a different characteristic in the list of characteristics, the list of values displayed in the second list may be replaced with the values associated with the touched characteristic. Those values displayed in the second list that are selected by the user before the user touches a different characteristic in the list of characteristics may be saved and used to later filter the data.

Additionally, the list of characteristics may be modified to display a representation of each saved value selected from one or more of the second value lists. This representation may include an identifier of each saved value or a generic reference to indicate that a value was selected or saved. The representation may be displayed in an area of the characteristic list allocated to a characteristic associated with a respective saved value. For example, if a selected characteristic has four possible values associated with it, of which two of the values are selected by a user and saved, then the characteristic list may be modified to display the two saved values in an area of the characteristic list allocated to the selected characteristic.

Alternatively, the characteristic list may be modified to display a generic reference to indicated in an area of the characteristic list allocated to the selected characteristic that values associated with the selected characteristic have saved or otherwise selected by the user. The generic reference may include, but is not limited to, terminology indicated a quantity of values that have been selected. In some instances, the modifications to the characteristic list may vary depending on whether the values to be displayed in the characteristic list exceed a space in the characteristic allocated for the values. If this situation occurs, the characteristic list may be modified to display the generic reference instead of the saved values.

Once a user is finished selecting different filter values for different characteristics, a set of data may then be filtered based on the selected and saved value. A result of the filtering may then be presented to the user. Additionally, a selectable object associated with one or more of the characteristics having user selected or saved values may also be displayed with the result. If the user selects this selected object displayed with the result, the user may be presented with one or more values of one or more characteristics associated with the selected object. The user may then select different values or cancel the filter based on this characteristic, at which time the filter will be re-executed with the new user selected values or cancellation, and the re-filtered result may be displayed instead of the prior result.

FIG. 1 shows an exemplary process for filtering data through a touch screen interface of a device. The touch screen interface may include a touch sensitive surface and a sensor for identifying user contact with the touch sensitive surface. In some instances, instructions for executing the process shown in FIG. 1 may be stored in a non-transitory computer readable medium for execution by a processing device.

In box 1, a filter menu may be displayed. The filter menu may include a first list of selectable characteristics for filtering data in the touch screen interface. The filter menu may be displayed in response to a user selecting a filtering option from a data analysis application. The filter menu may be displayed as part of a popup window.

Once a user selects one of the selectable characteristics in the first list, in box 2 a second list of selectable values associated with the user selected first list characteristic may be displayed in the filter menu of the touch screen interface. The second list may be displayed in response to a user selection of one of the selectable characteristics in the first list from the touch screen interface. The first list and the second list may be positioned side-by-side in the filter menu.

The selectable characteristics in the first list may correspond to different fields in a data source and the selectable values in the second list may correspond to different values associated with a respective field in the data source. The values displayed in the second list may but need not include only those values in the data source that are associated with the selected first list characteristic. The values displayed in the second list may include a range of possible values associated with the selected first list characteristic irrespective of whether those values are in the data source.

In box 3, each value selected by a user from the displayed second list may be stored. The value may be stored in a register, cache, computer readable medium, or other memory of the device. The value may be saved with persistence in non-volatile memory or the value may be saved temporarily in volatile memory.

In some instances, an area in the first list associated with the selected first list characteristic may be modified to display a user selected value from the second list associated with the selected first list characteristic. In some other instances, an area in the first list associated with the selected first list characteristic may be modified to display a quantity of user selected values selected from the second list associated with the selected first list characteristic.

In other instances, an aggregate character length of combining each user selected value from the displayed second list may be computed. The computed aggregate character length may be compared to an allocated space in the first list for displaying user selected values associated with the selected first list characteristic. If the computed aggregate character length exceeds the allocated space in the first list, a quantity of the user selected value(s) from the displayed second list may be displayed in the allocated space. Otherwise, if the computed aggregate character length does not exceed the allocated space in the first list, each user selected value from the displayed second list in the allocated space may be displayed.

In box 4, a determination may be made as to whether a user has selected another one of the selectable characteristics displayed in the first list or has taken another action to close the filter menu or otherwise end the selection process.

In box 5, if the determination indicates that the user has selected another one of the selectable characteristics displayed in the first list, the displaying of the second list of selectable values in box 2 and the storing of each user selected value in box 3 may be repeated using the newly selected characteristic from the first list.

In box 6, if the determination indicates that the user has not selected another one of the selectable characteristics displayed in the first list and has instead taken another action to close the filter menu or otherwise end the selection process, a set of data may be filtered according to each of the stored user selected values in box 13 associated with each respective selected first list characteristic using a processing device.

In box 7, the filtered data and two or more selectable objects may all be displayed in the touch screen interface of the device. Each of the selectable objects may correspond to a different selected first list characteristic having at least one stored user selected value associated with it. Each of the selectable objects may also display an interface for a user to select a different value from the second list associated with its respective first list characteristic and re-filter the displayed data. This interface may be displayed when a user selects one of the selectable objects. The selectable objects may be user selectable buttons displayed in a space of the touch screen interface allocated for the buttons.

In some instances, the buttons to be displayed may be compared to a space allocated for the buttons. If all of the buttons to be displayed are actually able to be displayed in the allocated space for the buttons, then all of the buttons may be displayed in the allocated space for the buttons. Otherwise, a consolidated button representing each button that is not displayed in the allocated space for the buttons may be displayed. A user activation of the consolidated button may display an interface for a user to select a first list characteristic associated with each button that is not displayed in the allocated space for buttons and then select a value associated with a selected first list characteristic. In some instances, at least one of the buttons may be displayed in the allocated space for the buttons in addition to the consolidated button.

In some instances, at least one of the stored user selected value associated with a corresponding first list characteristic of the user selected button may be retrieved from a register or other memory source. The at least one retrieved user selected value may be displayed in a third list on the touch screen interface. Each selectable value in the second list of selectable values associated with the corresponding first list characteristic that is not included in the retrieved at least one stored user selected value associated with the corresponding first list characteristic of the user selected button may be identified. Each identified selectable value may then be displayed in a fourth list on the touch screen interface. The third list and the fourth list may be displayed in a popup window appearing in response to the user selection of the button.

Figure 2:
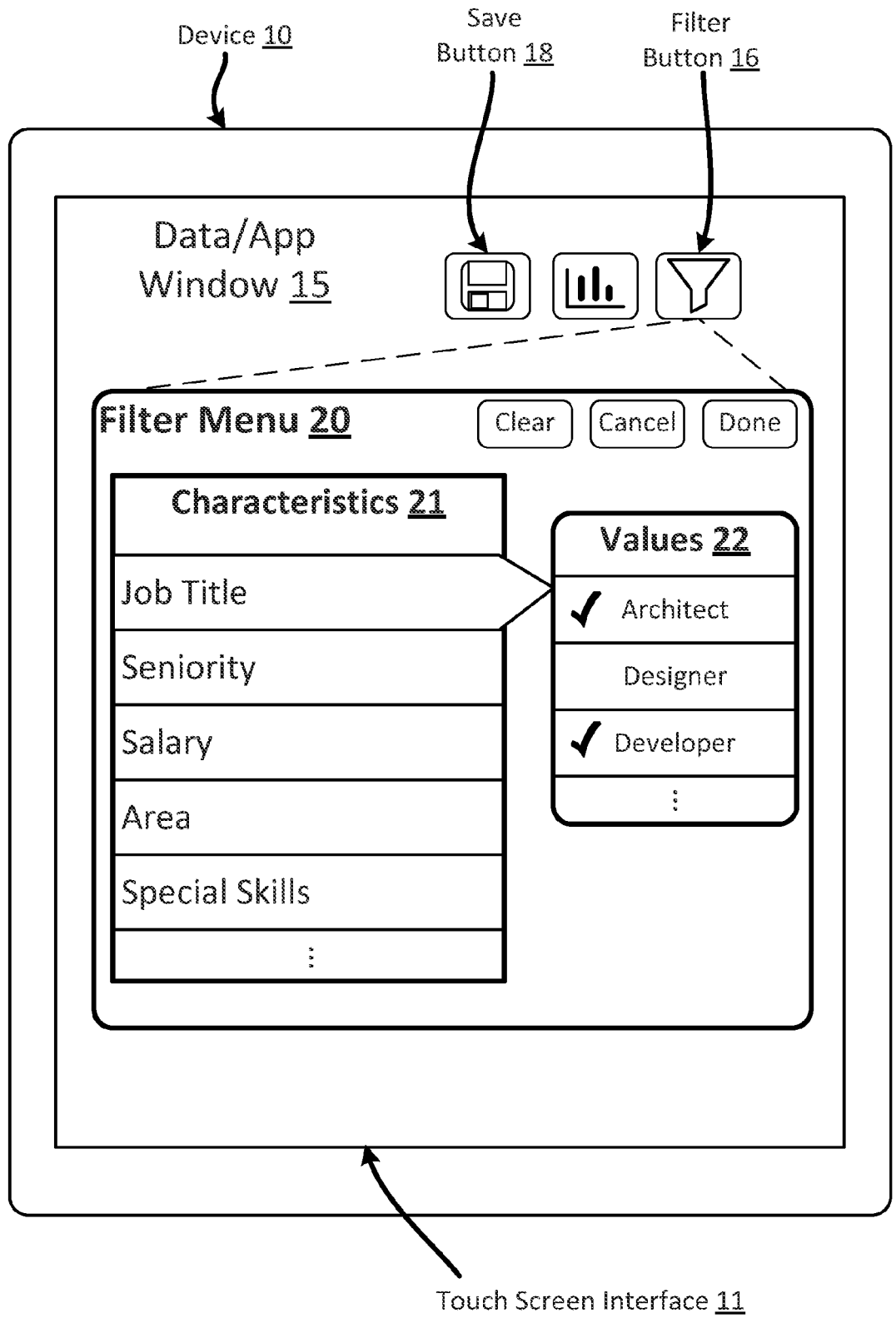
FIGS. 2 to 5 shows an exemplary user interface and changes thereto in different embodiments.

FIG. 2 shows a first exemplary user interface. A device 10 may include a touch screen interface 11. Components of a data analysis application may be displayed in a data or application window 15 within the touch screen interface 11 of the device 10. The components displayed in the window 15 may include one or more buttons, such as a save button 18, filter button 16, and other buttons such as a graph/output view button.

The data analysis application may be configured to analyze data and display the results of the analysis to the user in the window 15. In some instances, the data analysis may be performed by applying one or more functions, algorithms, or queries to the data in order to generate the results. Other techniques may be used in other instances. The data analysis application may include an option to filter data before, during, or after applying the functions, algorithms, or queries in order to generate a filtered result.

A filter menu 20 may be displayed in the touch screen interface 11. The filter menu 20 may be displayed in some instances in response to a user selecting the filter button 16 through the touch screen interface. The filter menu 20 may include a first list 21 and a second list 22. The first list 21 may include a list of user selectable characteristics for filtering data in the data analysis application. The list of user selectable characteristics may include variables, data fields, parameters, or other criteria for filtering the data. A clear button, a cancel button, and a done button may also be provided in the filter menu 20.

The clear button may be used to clear those selections made by a user in the filter menu 20. The cancel button may be used to cancel user selections made in the filter menu 20 and close the filter menu 20. The clear and/or cancel buttons, if included, may be inactive or not displayed until the user makes at least one selection in the filter menu 20. The done button may be used to save user selections made in the filter menu 20 and close the filter menu 20.

In the example shown in FIG. 2, the data analysis application is configured to compute a headcount forecast, though in other embodiments, the data analysis may be configured to perform different analyses with different characteristics and values. The characteristics list 21 includes a list of data fields, such as Job Title, Seniority, Salary, Area, and Special Skills. If a user touches the job title characteristic (or any of the other characteristics in the list 21), a second list of values 22 may appear side-by-side to the first list of characteristics 21. The values displayed in the second list 22 may correspond to values associated with touched job title characteristic. For example, touching the job title characteristic 21 may cause the job title values Architect, Designer, and Developer to be displayed in the second list of values 22. In this example, the user may select the job title values Architect and Developer, as indicated by the check mark in the second list 22.

Figure 3:
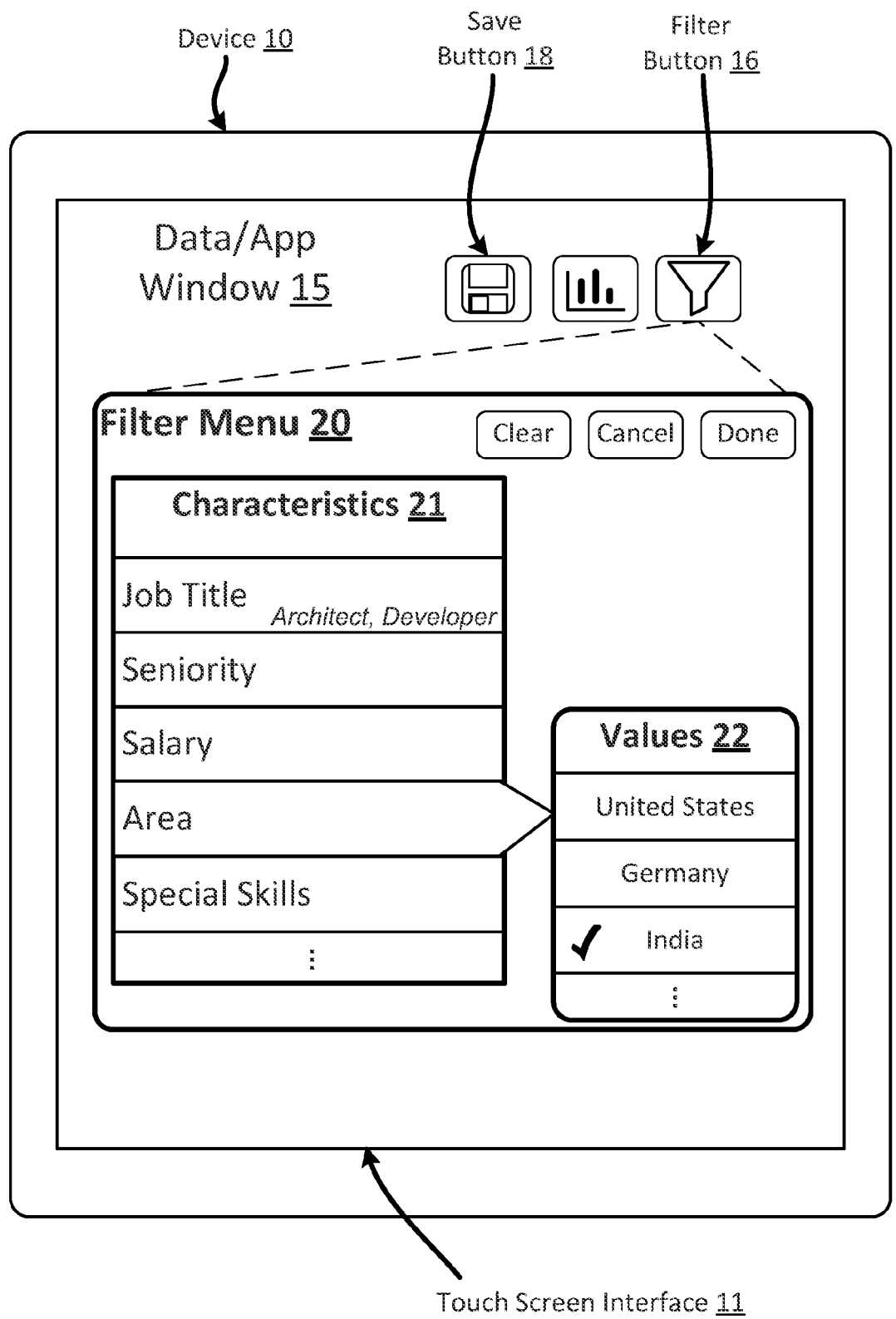

After the user selects the job title values Architect and Developer from the second list 22, the user may select the Area characteristic 21. FIG. 3 shows exemplary changes to the interface after a user the selects the Area characteristic 21. In this example, the previously selected job title values Architect and Developer in FIG. 2 may be added to an area in the first characteristics list 21 associated with the Job Title characteristic, as shown by the words "Architect, Developer" added to the Job Title characteristic in the first list of characteristics 21.

Additionally, the values displayed in the second list 22 may be replaced with those values associated with the selected Area characteristic. Thus, the area values United States, Germany, and India may be displayed in the second list of values 22 after the Area characteristic is selected by the user. In this example, the user may select the Area value India.

Figure 4:
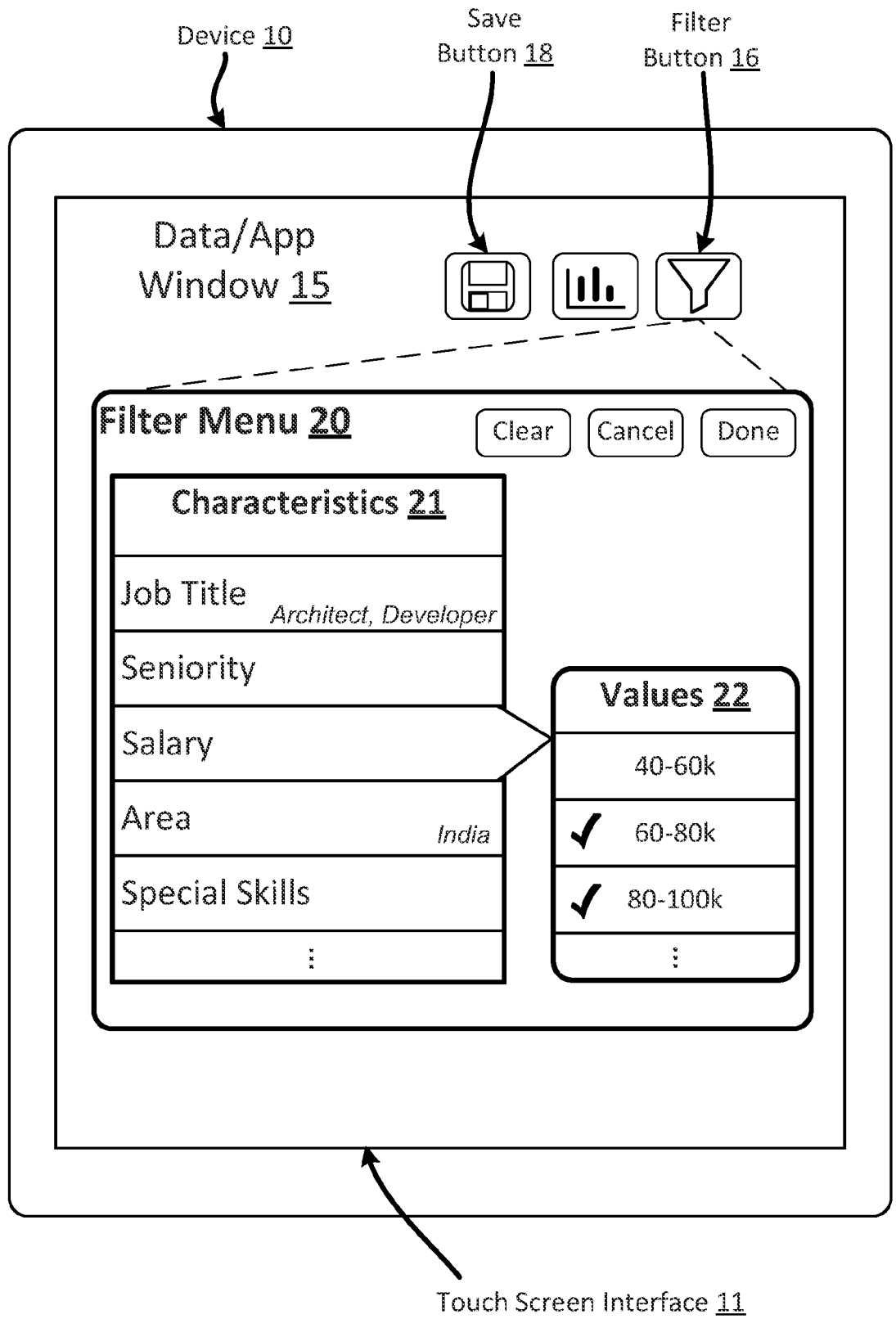

After the user selects the Area value India from the second list 22, the user may select the Salary characteristic from the first list 21. FIG. 4 shows exemplary changes to the interface after a user the selects the Salary characteristic 21. In this example, the previously selected Area characteristic value India in FIG. 3 may be added to an area in the first characteristics list 21 associated with the Area characteristic, as shown by the word "India" added to the Area characteristic in the first list of characteristics 21.

Additionally, the values displayed in the second list 22 may be replaced with those values associated with the selected Salary characteristic. Thus, the Salary values 40-60 k, 60-80 k, and 80-100 k may be displayed in the second list of values 22 after the Salary characteristic is selected by the user. In this example, the user may select the Salary values 60-80 k and 80-100 k.

Figure 5:
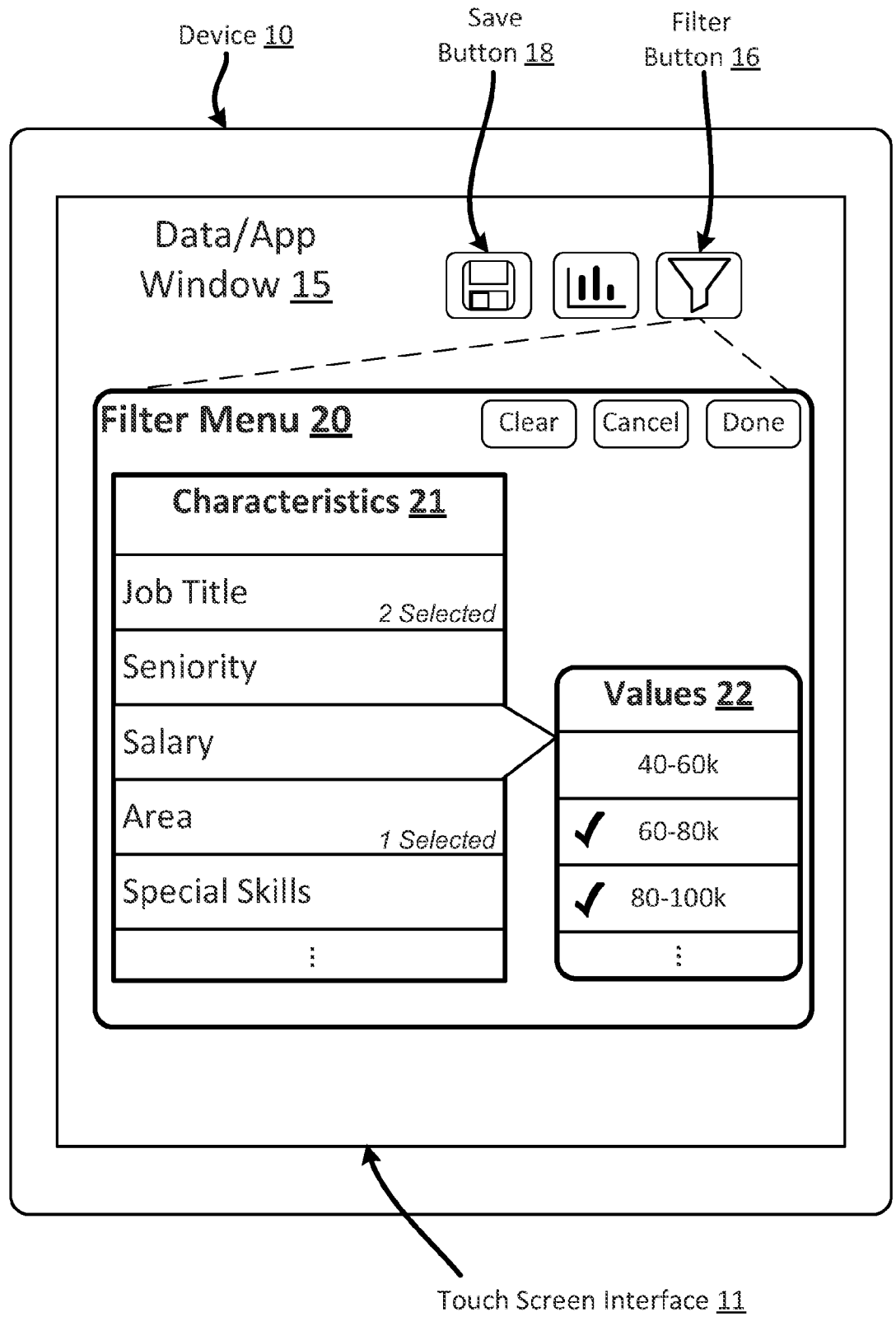

FIG. 5 shows different modifications to the first characteristics list 21 after a user selects one or more values from the second list 22. In this example, instead of displaying the job title values "Architect, Developer" and the Area value "India" in the first list of characteristics 21 as shown in FIG. 4, in the embodiment shown in FIG. 5, the first list of characteristics may be modified to indicate that two values were selected pertaining to the job title characteristic with the words "2 Selected." Similarly, the Area characteristic in the first list 21 may be modified to indicate that only one value was selected with the words "1 Selected."

Figure 6:
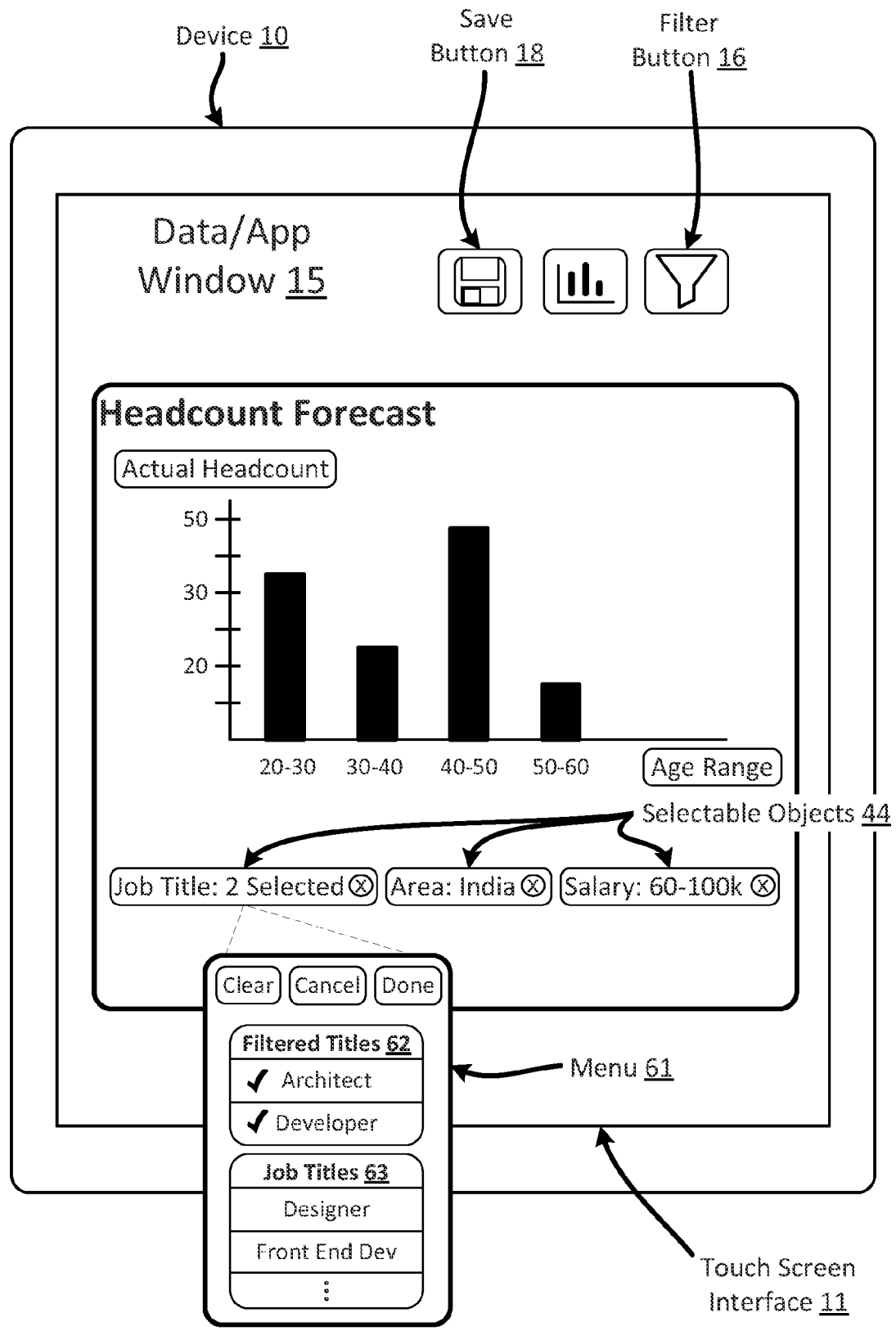
FIG. 6 shows an exemplary output after the above characteristic value selections in FIGS. 2 to 4 have been completed.

FIG. 6 shows an exemplary output after the above characteristic value selections in FIGS. 2 to 4 have been completed from the filter menu 20. In some instance, the selections from the filter menu 20 may be completed by the user touching the Done button in the filter menu 20 or by touching another designated place in the touch screen interface 11 or elsewhere. Once the selection process from the filter menu 20 is complete, the data may be filtered according to the selected characteristic values so that only a subset of the data matching the selected characteristic values is outputted. In this example, the data may be analyzed and filtered to output a headcount graph showing an age range on the horizontal axis and an actual headcount on the vertical axis. Below the graph, one or more selectable objects 44 may be displayed. Each of the selectable object 44 may correspond to a different characteristic in the first list 21 having at least one value selected from the second list 21.

In the example shown in FIGS. 2 to 4, the only characteristics having at least one value selected were the Job Title characteristic, the Area characteristic, and the Salary characteristic. Thus, in this example, three selectable object characteristics may be displayed corresponding to the respective Job Title, Area, and Salary characteristics. In some instances, the selectable objects 44 may be displayed as touchable buttons.

A button may include a name or identifier of the characteristic associated with the button. A button may also include an identifier of one or more selected values associated with the characteristic. For example, the Salary button may include the selected salary range of 60-100 k. Similarly, the Area button may include the selected area India.

The Job Title button may include the identifier "2 Selected" to indicate that two values, the Architect and Developer values, have been selected. In some instances, the space allocated for identifiers of selected values may be limited. In this case, an abbreviation or other identifier may be used in place of the actual names of the selected values. In some instances, the actual names of the selected values may be used unless the length of the actual names exceeds the allocated space. In these situations, an alternative identifier, including, but not limited to, the number of values selected may be displayed instead as shown by the "2 Selected" identifier in the Job Title button.

Once a user touches or otherwise activates one of the selected objects 44, a menu 61 may appear that enables the user to change the value selection associated with the characteristic. One section of the menu 61 may show a list of values currently selected for filtering 62. Another section of the menu 61 may show a list of available remaining values 63 that may be selected for filtering. The menu 61 may also including a clear button for automatically deselecting all values for filtering and/or a select all button for automatically selected all possible values for filtering. A user may touch a value in the filtered value list 62 to remove it from a filtering operation or touch a value in the remaining value list 63 to select it for filtering.

In the example shown in FIG. 6, if the user touches the Job Title button 44, a Job Title value selection menu 61 may appear. The menu 61 may display a list of previously selected job title values for filtering 62 in the upper portion of the menu 61, in this case the values Architect and Developer were previously selected for filtering. A user may touch these values to remove filtering for one or more of these values. A lower portion of the menu 61 may list the remaining job title values 63, such as Designer, Front End Developer, and so on, that the user may select for filtering. A user may also touch a particular area of button, in case the portion of the button marked with a circled 'X' to remove that characteristic filter altogether.

Once the user is done changing the values to be filtered in the menu 61, the new filter selections may be applied to the data and the output, such as the graph shown in FIG. 6, may be recalculated accordingly.

Figure 7:
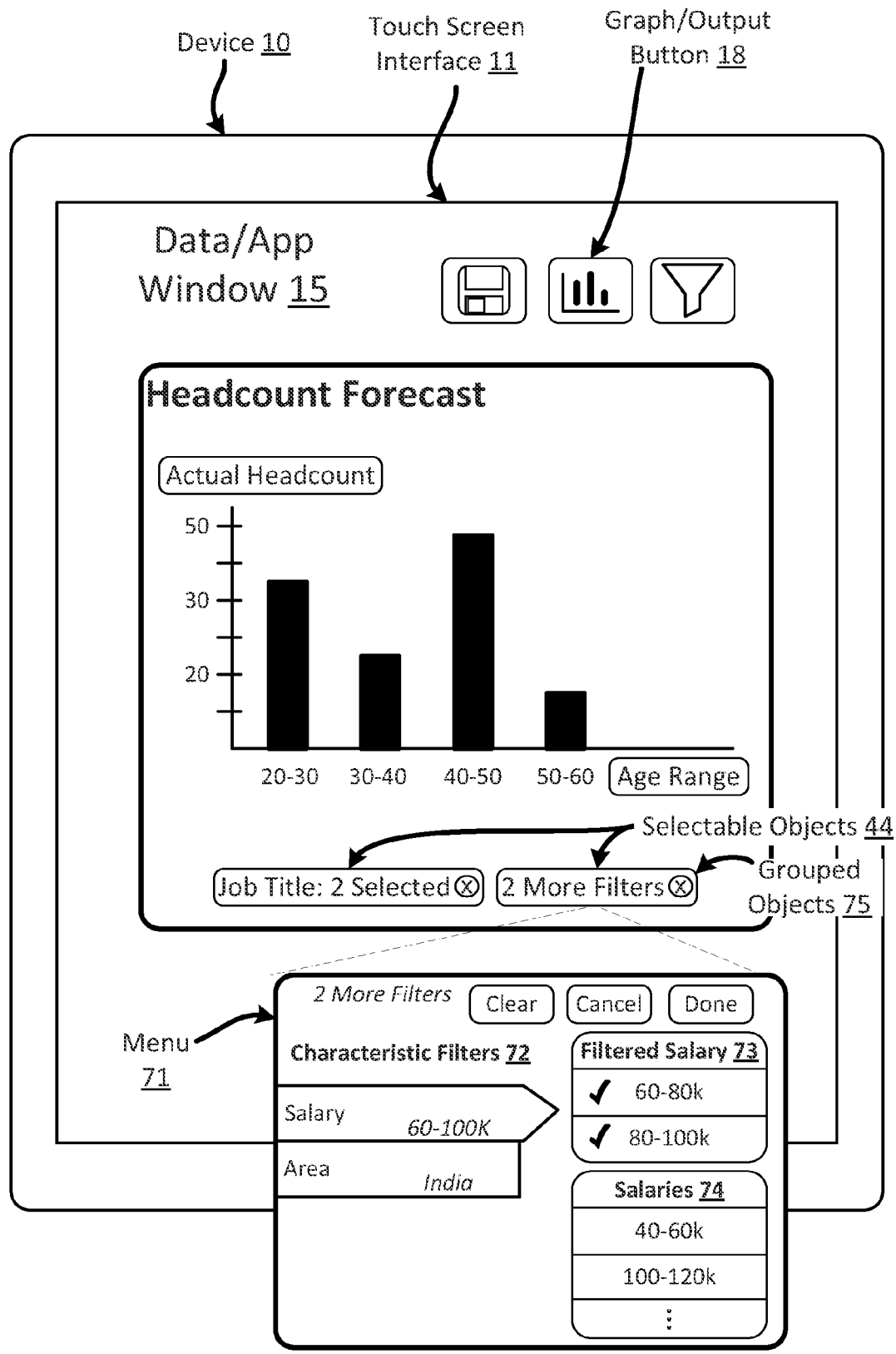
FIG. 7 shows an alternate exemplary output to that shown in FIG. 6.

FIG. 7 shows an alternate exemplary output to that shown in FIG. 6 after the above characteristic value selections in FIGS. 2 to 4 have been completed from the filter menu 20. In some instances, the space allocated for displaying the selectable objects 44 may be limited. In these instances, it may not be possible to display a unique selectable object 44 for each characteristic from the first list 21 having one or more selected values from the second list 22. The characteristics from the first list 21 that cannot be displayed a independent selectable objects 44 may be grouped together into a single grouped object 75, which may a button. The grouped object button 75 may include a visual identifier of the number of characteristics being grouped. In this example, the grouped object button 75 includes the text "2 More Filters" to indicate that it is grouping two characteristics from the first list 21 that cannot be displayed as an independent selectable object like the Job Title Object 44. Other visual identifiers including, but not limited to, pictures and non-numerical identifiers, may be used in other embodiments.

Once the user touches or otherwise selects the grouped object 75, a menu 71 may be displayed in the touch screen interface 11. The menu 71 may include a list of the characteristics 72 having at least one value selected for filtering. In this example, the Salary and Area characteristics may be displayed in the characteristics list 72, along with the an identifier of the previously selected values, such as 60-100 k for the Salary characteristic and India for the Area characteristic.

Once the user touches or otherwise selects one of the characteristics from the characteristics filter list 72, lists of values 73 and 74 associated with the selected characteristic may be displayed. A filtered value list 73 may show a list of values currently selected for filtering. A remaining value list 74 may show a list of available remaining non-selected values associated with the selected characteristic that may be selected for filtering. The menu 61 may also including a clear button for automatically deselecting all values for filtering, a select all button for automatically selected all possible values for filtering, and/or a done button for finalizing the value selections and exiting the menu 71. A user may touch a value in the filtered value list 73 to remove it from a filtering operation or touch a value in the remaining value list 74 to select it for filtering.

Once the user is done changing the values to be filtered in the menu 71, the new filter selections may be applied to the data and the output, such as the graph shown in FIG. 7, may be recalculated accordingly.

Figure 8:
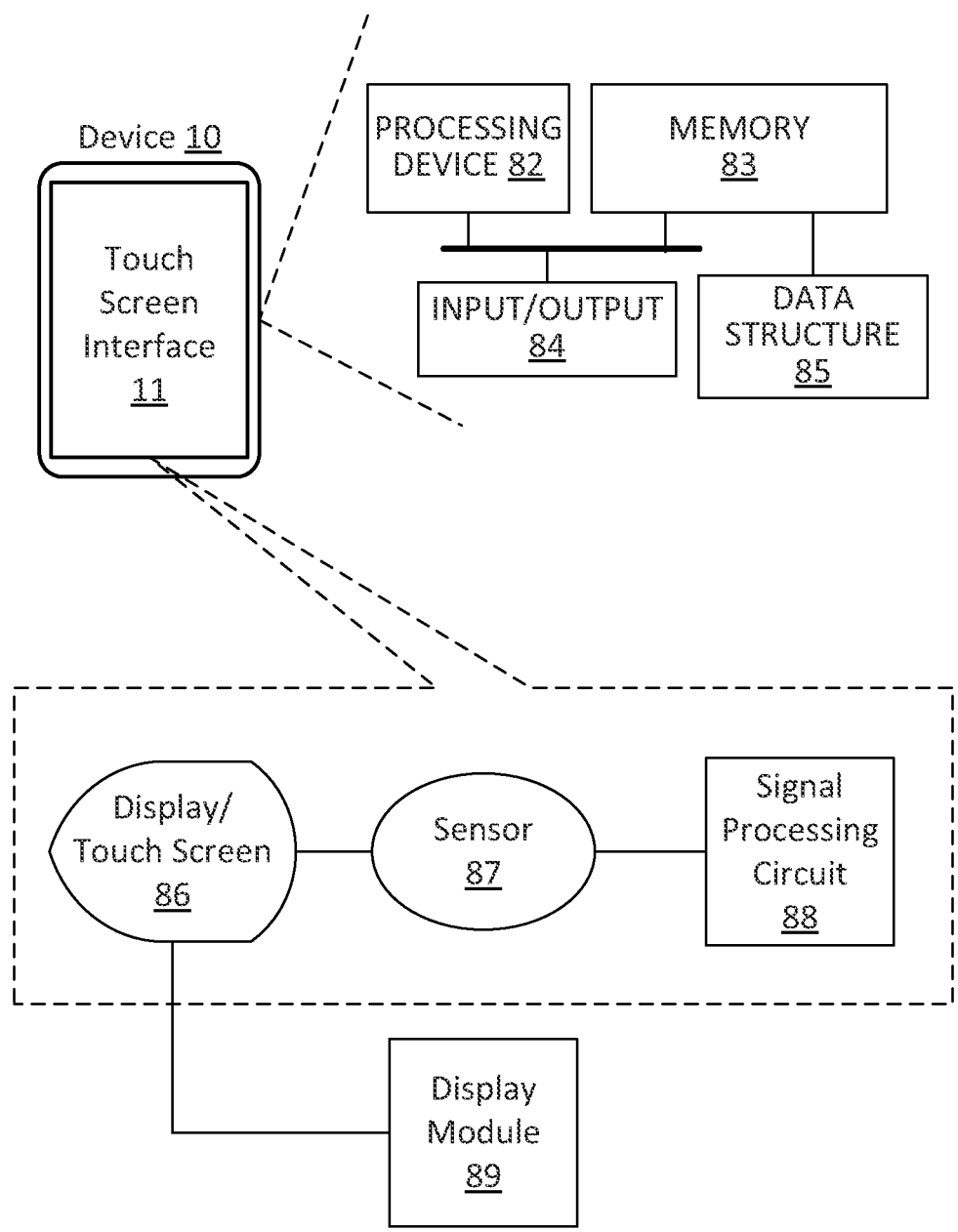
FIG. 8 shows an exemplary architecture.

FIG. 8 shows an exemplary architecture. A device may include a touch screen interface 11, display module 89, processing device 82, memory 83, and communications interface 84. The touch screen interface 11 may include a display 86, which may be a touch screen, capable of displaying data to a user of the device 10. The display 86 may be coupled to the display module 89 and a sensor 87, which may be a capacitive touch detection sensor, configured to detect and track movement on the surface and/or in the vicinity of the display 86. The sensor 87 may be coupled to a signal processing circuit that is configured to identify, locate, and/or track object movement based on the data obtained from sensor 87.

Memory 83 may include a computer readable medium storing application modules, which may include instructions associated with the display module 89. The display module 89 may also be coupled to and/or include the processing device 82, which may be used to execute instructions causing the touch screen interface 11 to display particular data. In some instances the display module 89 a display module capable of displaying a filter menu including a first list of selectable characteristics for filtering data in the touch screen interface 11. The display module 89 may also be capable of, responsive to a user selection of one of the selectable characteristics in the first list from the touch screen interface, displaying a second list of selectable values associated with the selected first list characteristic in the filter menu of the touch screen interface. The display module 89 may also be capable of repeating the displaying of the second list of selectable values when a new user selection of one of the selectable characteristics in the first list is made. The display module 89 may also be capable of displaying filtered data and a plurality of selectable objects in the touch screen interface, each of the plurality of selectable objects corresponding to a different selected first list characteristic having at least one stored user selected value associated with it. The display module 89 may also be capable of displaying an interface for a user to select a different value from the second list associated with its respective first list characteristic for re-filtering responsive to a user selection of the one of the selectable objects.

The device 10 may contain a processing device 82, memory 83 storing loaded data or a loaded data structure 85, and a communications device 84, all of which may be interconnected via a system bus. In various embodiments, the device 10 may have an architecture with modular hardware and/or software systems that include additional and/or different systems communicating through one or more networks via communications device 84. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 84 may enable connectivity between the processing devices 82 in the device 10 and other systems by encoding data to be sent from the processing device 82 to another system over a network and decoding data received from another system over the network for the processing device 82.

In an embodiment, memory 83 may contain different components for retrieving, presenting, changing, and saving data and may include computer readable media. Memory 83 may include a variety of memory devices, for example, Dynamic Random Access Memory (DRAM), Static RAM (SRAM), flash memory, cache memory, and other memory devices. Additionally, for example, memory 83 and processing device (s) 82 may be distributed across several different computers that collectively comprise a system. Memory 83 may be capable of storing each user selected value from the displayed second list each time the second list is displayed Processing device 82 may perform computation and control functions of a system and comprises a suitable central processing unit (CPU). Processing device 82 may include a single integrated circuit, such as a microprocessing device, or may include any suitable number of integrated circuit devices and/or circuit boards working in cooperation to accomplish the functions of a processing device. Processing device 82 may execute computer programs, such as object-oriented computer programs, within memory 83. Processing device 82 may be capable of filtering data according to each stored user selected value associated with each respective selected first list characteristic.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the processing device 82 is shown as separate from the signal processing circuit 88, in some instances the signal processing circuit 88 and the processing device 82 may be functionally integrated.

We claim:

1. A method for filtering data through a touch screen interface of a device comprising:

displaying a filter menu including a first list of selectable characteristics for filtering data in the touch screen interface;

responsive to a user selection of one of the selectable characteristics in the first list from the touch screen interface, displaying a second list side by side with the first list in the filter menu, the second list including selectable values associated with the selected characteristic from the first list;
storing each user selected value from the displayed second list;
responsive to minimization of the second list, modifying an area in the first list associated with the selected first list characteristic to display information about the user-selected value(s) from the second list, wherein the modifying includes displaying a number representing a quantity of the user selected value(s) selected from the second list associated with the selected first list characteristic;
repeating the displaying of the second list of selectable values and the storing of each user selected value when a new user selection of one of the selectable characteristics in the first list is made;
filtering data according to each stored user selected value associated with each respective selected first list characteristic using a processing device; and
displaying the filtered data and a plurality of selectable objects in the touch screen interface, each of the plurality of selectable objects corresponding to a different selected first list characteristic having at least one stored user selected value associated with it, wherein a user selection of one of the selectable objects displays an interface for a user to select a different value from the second list associated with its respective first list characteristic and re-filters the displayed data.

2. The method of claim 1, wherein the touch screen interface includes a touch sensitive surface and a sensor for identifying user contact with the touch sensitive surface.

3. The method of claim 1, wherein the selectable characteristics in the first list correspond to different fields in a data source and the selectable values in the second list correspond to different values associated with a respective field in the data source.

4. The method of claim 3, wherein the selected values displayed in the second list include only those values in the data source associated with the selected first list characteristic.

5. The method of claim 3, wherein the selected values displayed in the second list includes a range of possible values associated with the selected first list characteristic irrespective of whether those values are in the data source.

6. The method of claim 1, wherein the modifying an area includes displaying at least one of the user selected value(s) from the second list associated with the selected first list characteristic.

7. The method of claim 1, further comprising:
computing an aggregate character length of combining each user selected value from the displayed second list;
comparing the computed aggregate character length to an allocated space in the first list for displaying user selected values associated with the selected first list characteristic;
if the computed aggregate character length exceeds the allocated space in the first list, displaying a quantity of the user selected value(s) from the displayed second list in the allocated space; and
otherwise, if the computed aggregate character length does not exceed the allocated space in the first list, displaying each user selected value from the displayed second list in the allocated space.

8. The method of claim 1, wherein the plurality of selectable objects is represented by at least one user selectable button displayed in a space of the touch screen interface allocated for the buttons.

9. The method of claim 8, further comprising:
comparing the buttons to the space allocated for the buttons; and
if all of the buttons are able to be displayed in the allocated space for the buttons, then displaying all of the buttons in the allocated space for the buttons,
otherwise:
displaying at least one of the buttons in the allocated space for the buttons, and
displaying a consolidated button representing each button that is not displayed in the allocated space for the buttons, wherein a user activation of the consolidated button displays an interface for a user to select a first list characteristic associated with each button that is not displayed in the allocated space for buttons and then select a value associated with a selected first list characteristic.

10. The method of claim 8, further comprising, responsive to a user selection of a button:
retrieving the at least one stored user selected value associated with a corresponding first list characteristic of the user selected button;
displaying the at least one retrieved user selected value in a third list on the touch screen interface;
identifying each selectable value in the second list of selectable values associated with the corresponding first list characteristic that is not included in the retrieved at least one stored user selected value associated with the corresponding first list characteristic of the user selected button; and
displaying each identified selectable value in a fourth list on the touch screen interface.

11. The method of claim 10, wherein the third list and the fourth list are displayed in a popup window appearing in response to the user selection of the button.

12. The method of claim 1, wherein the modified area in the first list corresponds to the selectable characteristic associated with the user-selected value(s) from the second list.

13. A non-transitory computer readable medium storing instructions that when executed by a processing device on a device having a touch screen interface, cause the processing device to:
display a filter menu including a first list of selectable characteristics for filtering data in the touch screen interface;
responsive to a user selection of one of the selectable characteristics in the first list from the touch screen interface, displaying a second list side by side with the first list in the filter menu, the second list including selectable values associated with the selected characteristic from the first list;
store each user selected value from the displayed second list;
responsive to minimization of the second list, modify an area in the first list associated with the selected first list characteristic to display information about the user-selected value(s) from the second list, wherein the modification includes displaying a number representing a quantity of the user selected value(s) selected from the second list associated with the selected first list characteristic;
repeat the display of the second list of selectable values and the storing of each user selected value when a new user selection of one of the selectable characteristics in the first list is made;
filter data according to each stored user selected value associated with each respective selected first list characteristic using a processing device; and display the filtered data and a plurality of selectable objects in the touch screen interface, each of the plurality of selectable objects corresponding to a different selected first list characteristic having at least one stored user selected value associated with it, wherein a user selection of one of the selectable objects displays an interface for a user to select a different value from the second list associated with its respective first list characteristic and re-filters the displayed data.

14. The non-transitory computer readable medium of claim 13, wherein the stored instructions further cause the processing device to modify an area in the first list associated with the selected first list characteristic to display a user selected value from the second list associated with the selected first list characteristic.

15. A device comprising:
a touch screen interface;
a display module capable of:
   displaying a filter menu including a first list of selectable characteristics for filtering data in the touch screen interface,
   responsive to a user selection of one of the selectable characteristics in the first list from the touch screen interface, displaying a second list side by side with the first list in the filter menu, the second list including selectable values associated with the selected characteristic from the first list,
   responsive to minimization of the second list, modifying an area in the first list associated with the selected first list characteristic to display information about the user-selected value(s) from the second list, wherein the modifying includes displaying a number representing a quantity of the user selected value(s) selected from the second list associated with the selected first list characteristic,
   repeating the displaying of the second list of selectable values when a new user selection of one of the selectable characteristics in the first list is made,
   displaying filtered data and a plurality of selectable objects in the touch screen interface, each of the plurality of selectable objects corresponding to a different selected first list characteristic having at least one stored user selected value associated with it, and
   displaying an interface for a user to select a different value from the second list associated with its respective first list characteristic for re-filtering responsive to a user selection of the one of the selectable objects;
a memory capable of storing each user selected value from the displayed second list each time the second list is displayed; and
a processing device capable of filtering data according to each stored user selected value associated with each respective selected first list characteristic.

16. The device of claim 15, wherein the touch screen interface includes a display, a sensor coupled to the display, and a signal processing circuit coupled to the sensor.

17. The device of claim 15, wherein the display is a touch screen.

18. The device of claim 17, wherein the sensor is capable of detecting and track movement on a surface or in a vicinity, of the display and the signal processing circuit is capable of identifying an object location based on data obtained from the sensor.

19. The device of claim 17, wherein the sensor is a capacitive touch detection sensor.

* * * * *